Patented Sept. 13, 1932

1,876,846

UNITED STATES PATENT OFFICE

LEOPOLD BRANDT, OF DORTMUND-HORDE, GERMANY, ASSIGNOR TO THE FIRM VEREINIGTE STAHLWERKE AKTIENGESELLSCHAFT, OF DUSSELDORF, GERMANY

WELDING AGENT

No Drawing. Application filed August 4, 1930, Serial No. 473,132, and in Germany August 19, 1929.

This invention relates to improvements in welding agents.

It is known when welding metals, to employ inert gases which serve to prevent access of air to the weld. This object can be attained by using a welding powder which liberates suitable gases on heating.

It has now been found that the carbonyl compounds of different metals are pre-eminently suitable for use as agents developing gas when welding metals. The metal deposited combines with the welding metal and thus re-inforces the weld, whereas the escaping carbon monoxide prevents the access of atmospheric oxygen.

Iron and nickel carbonyls are the most generally suitable carbonyls for use in carrying out the present invention; for special purposes however, the carbonyls of uranium, vanadium, chromium, cobalt and the like may also be employed.

When welding iron or iron alloys, it is most advantageous to work with solid iron nona-carbonyl $Fe_2(CO)_9$, and to stir this into a paste with the liquid iron pentacarbonyl. The crystalline di-iron-ennea-carbonyl a$Fe_2(CO)_9$ constitutes the actual basis of the welding agent. However, as it is a powdery substance, it may be easily blown away by the welding flame. This is counteracted by combining with certain liquid substances into a paste. However, other solid iron carbonyl compounds such as for example, iron tetra-carbonyl may also be used in place thereof, either alone or in admixture with other solid carbonyls. With iron pentacarbonyl or with other liquid iron carbonyls also a suitable admixture is obtained.

Moreover nickel carbonyl in admixture with the aforementioned solid or liquid iron carbonyls may be used as liquid constituent, particularly when welding nickel or nickel alloys. It is also possible to mix the carbonyl compounds with other metal powders as well as with known welding agents, in order to combine their action with that of the carbonyls. The solid carbonyl compounds may also be mixed with liquid or salve-like organic substances, such as hydrocarbons, higher alcohols, fatty, wax-like and resinous substances for the purpose of producing pastes.

What I claim and desire to secure by Letters Patent of the United States is:

1. Agent for welding metals containing carbonyl compounds of metal of the iron group.

2. Agent for welding metals of the iron group containing a mixture of carbonyl compounds of different metals of the iron group.

3. Agent for welding metals of the iron group containing a mixture of carbonyl compounds of metals of the iron group selected from a group consisting of solid iron nona-carbonyl $Fe_2(CO)_9$ and liquid iron penta carbonyl $Fe(CO)_5$, the components of such mixture being in different physical condition and of different composition.

4. Agent for welding iron and iron alloys containing a mixture of liquid iron penta carbonyl and another iron carbonyl in solid condition.

5. Agent for welding metals containing carbonyl compounds of metals of the iron group in admixture with the known welding agents of the borax type.

6. Agent for welding metals containing carbonyl compounds of metals of the iron group in admixture with metal powders.

7. Agent for welding metals containing carbonyl compounds of metals of the iron group in admixture with organic substances which are suitable for forming a paste selected from a group consisting of hydrocarbons, higher alcohols, fat-like, wax-like and resin-like substances.

LEOPOLD BRANDT.